(12) United States Patent
Sosnowski

(10) Patent No.: US 11,540,436 B2
(45) Date of Patent: Jan. 3, 2023

(54) APPARATUS FOR DRESSING SURFACE OF GRAINED MATERIAL OR GRANULES

(71) Applicant: Wlodzimierz Sosnowski, Ciechanow (PL)

(72) Inventor: Wlodzimierz Sosnowski, Ciechanow (PL)

( * ) Notice: Subject to any disclaimer, the term of this patent is extended or adjusted under 35 U.S.C. 154(b) by 195 days.

(21) Appl. No.: 16/928,283

(22) Filed: Jul. 14, 2020

(65) Prior Publication Data
US 2020/0337215 A1 Oct. 29, 2020

Related U.S. Application Data

(63) Continuation of application No. PCT/PL2019/000005, filed on Jan. 18, 2019.

(30) Foreign Application Priority Data

Jan. 18, 2018 (PL) .......................... 424306

(51) Int. Cl.
*A01C 1/06* (2006.01)

(52) U.S. Cl.
CPC ...................... *A01C 1/06* (2013.01)

(58) Field of Classification Search
USPC ................................... 118/303, 19
See application file for complete search history.

(56) References Cited

U.S. PATENT DOCUMENTS 2,862,511 A 12/1958 Forsberg
3,911,183 A 10/1975 Hinkes
4,657,773 A * 4/1987 Mueller ............... B05B 3/1057
   47/57.6
4,759,945 A 7/1988 Nemecek et al.
5,993,903 A 11/1999 Toepfer et al.
2019/0126321 A1* 5/2019 Sosnowski .............. B07B 4/025

FOREIGN PATENT DOCUMENTS

DE     44 11 058 A1   10/1995
EP     1 035 913 B1    4/2003
PL        188184 B1   12/2004
PL        225841 B1    5/2017
WO    2017/179999 A1  10/2017

OTHER PUBLICATIONS

International Search Report dated Apr. 26, 2019, issued in counterpart International Application No. PCT/PL2019/000005 (3 pages).

* cited by examiner

*Primary Examiner* — Yewebdar T Tadesse
(74) *Attorney, Agent, or Firm* — WHDA, LLP

(57) ABSTRACT

In an apparatus below an uppermost module 7 having a centrifugal flow guide there is an axially positioned nozzle 17 supplying a dressing agent, directed onto a dispersing screen 20 which constitutes a cover of a chamber 19 arranged axially below the nozzle 17 and connected with an external blower 21, whereas above the nozzle 17 on the vertical axis of the body 1 there is positioned a shield 16, whereas below the chamber 19 there is arranged a module 10 having a centripetal flow guide, below which there is positioned another module 7 having a centrifugal flow guide, and the lower end of the body 1 is constituted by a module 10 having a centripetal flow guide.

14 Claims, 2 Drawing Sheets

APPARATUS FOR DRESSING SURFACE OF GRAINED MATERIAL OR GRANULES

CROSS-REFERENCE TO RELATED APPLICATIONS

This application is a continuation of International Application No. PCT/PL2019/000005, filed on Jan. 18, 2019, which claims the benefit of priority from the prior Polish Patent Application No. PL 424306, filed on Jan. 18, 2018, the entire contents of which are incorporated herein by reference.

BACKGROUND OF THE INVENTION

Field of the Invention

The present invention relates to an apparatus for dressing surface of grained material or plastic granules with a liquid suspension or powder which protects the dressed material against agglomeration.

Description of the Related Art

Known seed dressing machines have a sprinkling chamber provided with nozzles for spraying a dressing agent, wherein grains fed from a dispensing hopper are sprinkled in the chamber while falling under the action of gravity, and then mixed with a stirrer mounted in the bottom of the chamber. From Polish patent description No. PL 225841 a seed dressing machine is provided with a base on which a funnel-shaped sprinkling chamber is mounted vertically. Inside the chamber, on its axis, there is a vertical screw conveyor having a motor driven shaft, wherein a vane-type propeller is mounted on the shaft above the conveyor. A seed hopper outlet is situated at the lower part of the conveyor, while the outlet of the dressed seeds is positioned in its upper part. In the chamber, there are placed a plurality of nozzles for spraying the dressing agent, the nozzles being orientated opposite to each other. Seeds from the hopper are transferred by a conveyor to the top of the chamber, where they are scattered by a blade propeller, and then they are sprinkled by means of nozzles with the dressing agent while falling down, the nozzles cause their swirling movement at the same time. The treated seeds are removed by the outlet conduit to which they are delivered by means of the bottom part of the screw conveyor. A device for coating a granular material with a coating agent is known from the description of German patent No. DE 4411058, in which the characterizing feature is circulation of products in a swirl chamber. The device has a high-speed mixing cylinder in the form of a conical drum having walls expanding upwards. The dressing agent is sprayed onto the grained material in the mixing cylinder by spraying nozzles. For better displacement of the material in the cylinder, bent discharge vanes are arranged on a discharge ring above the cylinder, which reverse the material and bring it back down the cylinder, the vanes being shaped so that the material is reversed from the outer periphery of the cylinder back to the middle. A similar construction is described in the European Patent No. EP 1035913 relating to a device for drying powdery materials, in particular grains or food, fodder, means of pharmaceutical and other industries. The device has a swirl chamber with a rotor of a vertical axis of rotation which has a central horizontal surface and a conical jacket inclined at an angle of 20-70° with respect to the axis of rotation such that the face of the cone-shaped jacket having a larger diameter is placed at the top, this conical jacket has at least partially flat gas passages in the form of openings or sieves, and above the rotor, on the inner wall of the chamber there are arranged stationary directing vanes. Said vanes have the shape of a substantially circular or spiral segment in cross-section transverse to the rotor axis, their outer ends project out of the perimeter of the rotor chamber wall in the direction of the rotor axis, and the tangents of the inner wall and guiding vanes have the same inclination at the point of junction, wherein their inner ends are positioned at the central point of the radius of the rotor. The propeller is detachably mounted in the swirl chamber, and the gas flow is effected through perforations or screens having holes of various diameters. Further, there are known dressing machines equipped with a motor driven disc for spraying a dressing agent. From the description of Polish patent No. PL 188184 a sprinkling chamber for seed dressing machine is known, in which two independently driven rotating discs are used. The dressing agent is applied onto the upper disc which has a smaller diameter and is sprayed by this disc. Seed are supplied by the action of gravity from a hopper located above a motor which drives the disc, the seeds are pre-wetted when moving in a sprayed suspension, and then they fall onto the lower disc having a much larger diameter and an upwardly edged rim. During the rotation of the disc, the seeds are scattered by centrifugal force upwards into the chamber region filled with a suspension, and then they bounce off from the upper horizontal wall of the chamber and fall again, becoming effectively dressed for the third time. In the description of the U.S. Pat. No. 4,759,945 is disclosed a method and apparatus for dressing seed grains with a liquid coating agent and/or an aqueous encrustation agent. The highly efficient apparatus enables treatment of 6000 kg of grains per hour. The main element of the device is a vertical tower of a height of about 10 meters, consisting of a raising inner tube and a dropping outer tube, the diameter of the outer tube being almost twice as large as the diameter of the inner tube. The lower end of the inner tube is connected to the distributor of air supplied from a blower of capacity of 4000 m$^3$ per hour, heated in a pressure heater to a temperature of at least 80° C. Grains are fed from the hopper to the high-speed 2-meter long screw conveyor, making 1200 revolutions per minute, whereby a liquid dressing or encrusting agent is also supplied from a container by means of a dosing pump. The process of dressing grains is effected in a horizontal chamber of a screw conveyor, the conveyor outlet ends at the lower part of the raising inner tube. Above the upper end of the inner tube there is a separator for separating the dressed and dried grains from light impurities, the outer tube being covered with a cap provided with lateral outlets of polluted air. The device operates in such a way that the dressed grain having high humidity that is ejected from the horizontal conveyor chamber get into the stream of hot air, which dries and moves it upwards, and after hitting the separator the grain falls the action of gravity on the outer tube, where it is picked up to the bagging devices, whereas polluted air is discharged outside the outlet openings in the cap. In the international patent publication No. WO 2017/179999, which belongs to the applicant, there is disclosed an apparatus for separating and removing light impurities from a grained material, having a vertical body in which the upper part is a motor driven air suction fan and in the middle part the part is axially mounted a hopper connected to the inlet of the grained material. Below the hopper there is positioned a module in the form of a cylinder having a diameter corresponding to the diameter of the body, inside which there is one centrifugal flow guide in the form of an axial support, on whose surface in many transverse planes there are mounted many directing elements, the ends of which face towards the inner wall of the cylinder. Below the module there is a separate module in the form of a cylinder having a diameter corresponding to the diameter of the body, which constitutes an inward directing flow guide, on whose inner surface there are evenly spaced apart from each other and in different angular planes, directing vanes the ends of which face the axis of the apparatus. Optionally the apparatus may have a plurality of modules with a centrifugal flow guides and modules with a centripetal flow guides, said modules being arranged alternately below the hopper.

SUMMARY OF THE INVENTION

The object of the invention is to develop an apparatus for dressing grained material having a simple structure and high efficiency, which eliminates the problem of agglomeration of the dressed material, and also protects the environment from contamination due to applying the principle of closed air circulation.

The object of the invention is an apparatus for dressing surface of a grained material or granules, having a vertical through body, provided with arranged alternately modules having a centrifugal flow guide in a form of an axial support and plurality of directing elements ends of which face an inner wall of the body and modules having a centripetal flow guide in a form of plurality of directing vanes positioned on an inner wall of the module ends of which face towards the vertical axis of the body, in the body above the uppermost module having the centrifugal flow guide there is an axially attached hopper connected with a container of grained material, whereas the body is positioned inside a cylindrical housing, and in the upper part of the housing, above the body, there is an axially positioned a fan driven by a motor. According to the invention below the uppermost module having the centrifugal flow guide there is an axially positioned nozzle supplying a dressing agent, directed onto a dispersing screen having small openings which constitutes a cover of a chamber arranged axially below the nozzle and connected with an outer external blower, whereas above the nozzle on the vertical axis of the body there is positioned a shield, whereas below the chamber there is arranged the module having the centrifugal flow guide, below which there is positioned another module having the centrifugal flow guide, and the lower end of the body is constituted by the module having the centripetal flow guide. The upper end of the housing is tightly closed and the lower end of the housing is open and constitutes an outlet funnel of dressed material. The upper open end of the body is positioned below the fan whereas the housing is attached to a stationary frame. A rotary air throttle is mounted perpendicularly to the vertical axis of the body in the body above the hopper. A ratio of an area of a cross-section of the housing to an area of a cross section of the body amounts from 1.3 to 8. The hopper is closed from above with a cover having a shape of a spherical cap, and a shield has a shape of a spherical cap of a diameter of the base bigger than the diameter of the chamber covered with the dispersing screen having small openings. Also the dispersing screen is shaped as a spherical cap. The dispersing screen may be cone-shaped. A ratio of an area of a cross-section of the body to an area of the dispersing screen amounts from 6 to 70. The apparatus may have a plurality of the modules with the centrifugal flow guide and the modules with the centripetal flow guide positioned alternately below the chamber connected with the external blower. The presented construction assures uniform dressing of granular material with a dressing agent, and thanks to the closed circulation of air saturated with dispersed dressing agent the whole grain surface is dressed, including hard-to-reach places such as germ depressions, wherein the apparatus acts as a continuous flow installation, which enables significant efficiency of treatment, which exceeds than 6000 kg of grain per hour. During movement by the action of gravity, individual grains scattered by directing elements and vanes in the modules are spaced apart, which eliminates sticking of grains to each other that may occur in a process realized in a damp environment. The intensity of the stream of air saturated with the dressing agent can be adjusted by the throttle in order to obtain a proper drying of the material, while the substantially closed air circulation reduces the degree of environmental pollution. The usage of the screen having small openings assures obtaining a suspension in the form of a mist, because the dressing agent flowing out of the nozzle is dispersed by an air stream fed from the external blower into the chamber, preventing it from agglomeration.

DETAILED DESCRIPTION

Figure 1:
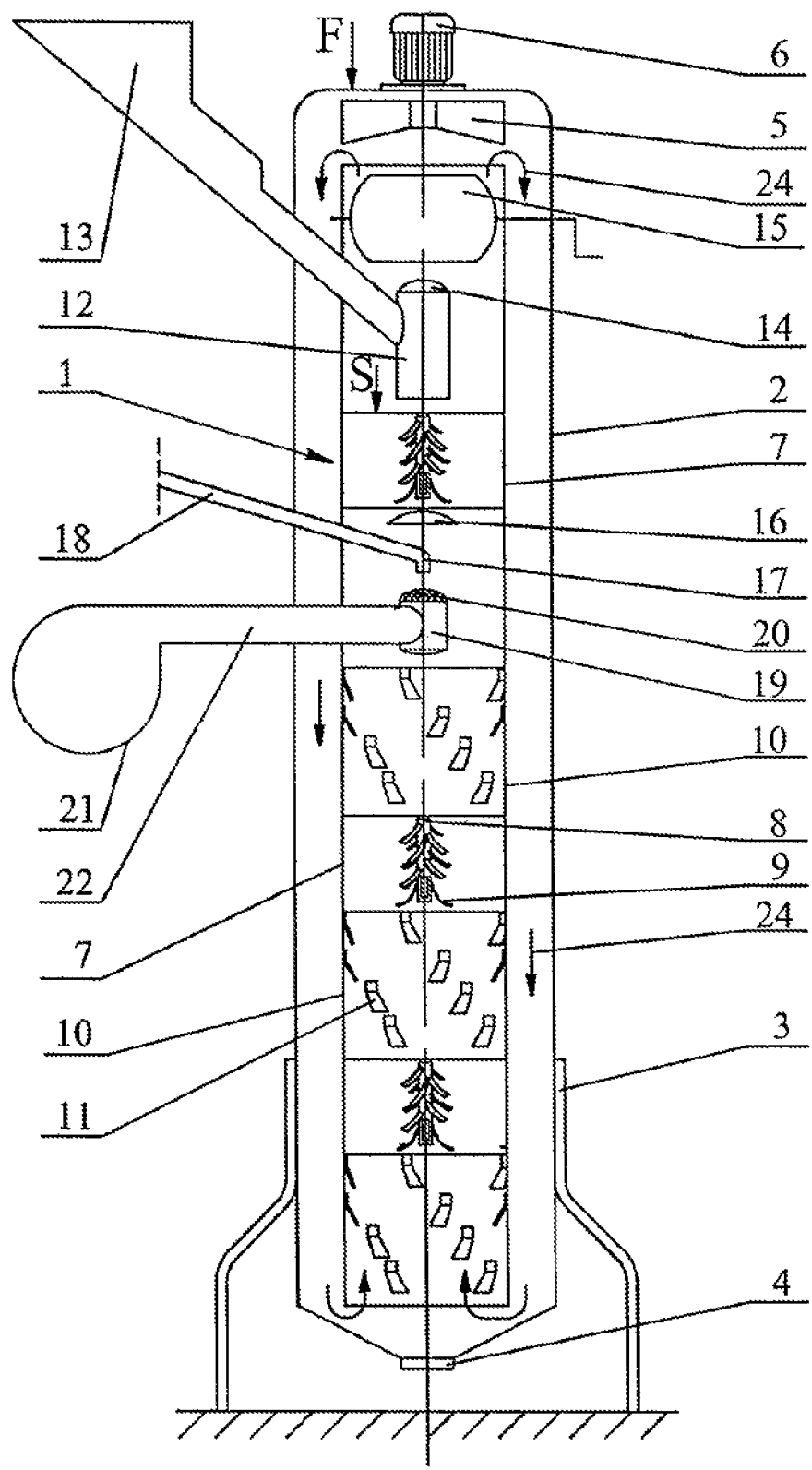
FIG. 1 shows an axial cross-section of the apparatus in a schematic view in which the three modules having centrifugal and centripetal flow guides are used.
Figure 2:
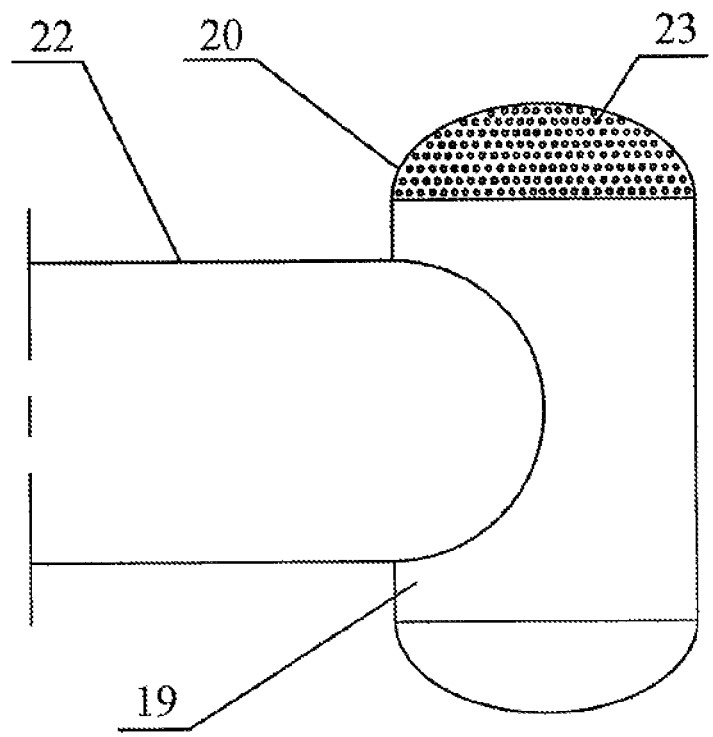
FIG. 2 shows an enlarged fragment of the apparatus showing the chamber covered with the screen shaped as the spherical cap.
Figure 3:
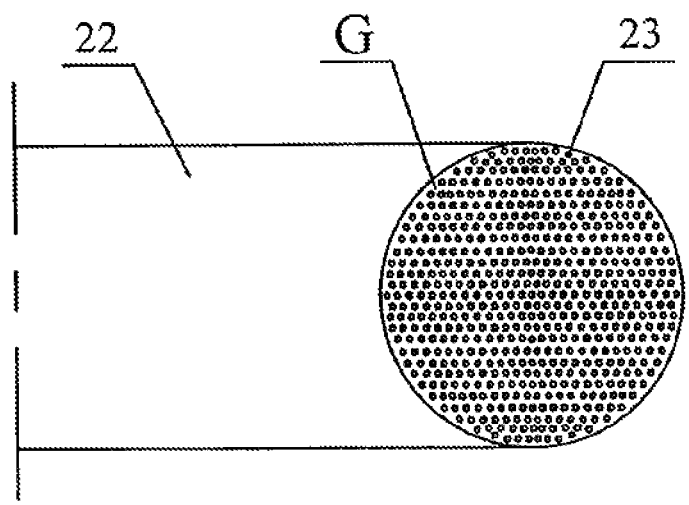
FIG. 3 presents a view of a fragment of FIG. 2 seen from side of the nozzle.

An apparatus according to the invention has a vertical cylindrical through body 1 positioned inside a cylindrical housing 2 attached to a stationary frame 3. The upper end of the housing 2 is tightly closed, while the lower end of the housing 2 is open and it constitutes an outlet funnel 4 of dressed grained material. In the upper part of the housing 2, above the open end of the body 1, there is positioned a fan 5 driven by a motor 6. The body 1 is provided with arranged alternately a modules 7, having a centrifugal flow guide in a form of an axial support 8 with a plurality of directing elements 9 of whose the ends face an inner wall of the body 1, and the modules 10 having a centripetal flow guide in a form of a plurality of directing vanes 11 arranged on an inner wall of the module 10 of whose the ends face towards the vertical axis of the body 1. Inside the body 1, above the uppermost module 7 having the centrifugal flow guide, is mounted axially a hopper 12 connected to a reservoir 13 of grained material, the hopper 12 being closed at the top by a cover 14 shaped as a spherical cap. In the body 1, above the hopper 12 a rotary air throttle 15 is fixed perpendicularly to the vertical axis of the body 1. Below the uppermost module 7 having the centrifugal flow guide, in the vertical axis of the body 1, there is situated a shield 16 shaped as a spherical cap, and on the axis of the shield 16 there is attached a nozzle 17 to feed the dressing agent supplied via a conduit 18 from a container not shown in the drawing. In the body 1 below the nozzle 17 there is situated a chamber 19, the upper cover of which is a dispersing screen 20, the chamber 19, being connected to an external blower 21 via a pipe 22. Below the chamber 19 there is the module 10 having the centripetal flow guide below which is positioned another module 7 with the centrifugal flow guides is positioned with the centrifugal flow guide. The nozzle 17 feeds the dressing agent directly onto the surface of the dispersing screen 20. The dispersing screen 20 preferably has the shape of the spherical cap, but may alternatively have a shape of a cone. The screen 20 has a plurality of evenly spaced small circular openings 23. The diameter of the base of the shield 16 is larger than the diameter of the chamber 19 covered by the dispersing screen 20, the shield 16 protects the dispersing screen 20 against agglomeration of falling grains. A ratio of an area S of a cross-section of the body 1 to an area G of the dispersing screen 20 amounts 6 to 70. The apparatus may have a plurality of the modules 7 with the centrifugal flow guide and a plurality of the modules 10 with the centripetal flow guide, said the modules 7 and 10 being arranged alternately below the chamber 19, and the module 10 with the centripetal flow guide constitutes the lower end of the body 1. The value of a ratio of a cross-section an area F of the housing 2 to the area S of a cross-section area S of the body 1 amounts 1.3 to 8. The circulation of saturated air in the body 1 is opposite to the direction of the movement of the grained material forced by the action of gravity and is marked with an arrows 24.

Hereunder is described the operation of the apparatus: the grained material fed from the reservoir 13 falls out from the hopper 12 under the action of gravity and drops onto the directing elements 9 of the centrifugal flow guide in the uppermost module 7, which distribute the material uniformly in the space of the body 1. At the same time, the dressing agent fed from the container via the conduit 18 is directed by the nozzle 17 onto the dispersing screen 20, the air supplied by the tube 22 from the external blower 21 to the chamber 19 is ejected through the openings 23 in the dispersing screen 20 causing dispersing of the droplets of the dressing agent, so that very fine droplets and mist are obtained. Small droplets stick to and dress the descending grain, while the mist flowing in the opposite direction provides even grain dressing. Further, the mist is drawn by the fan 5 to the upper open end of the body 1, from which it travels to the housing 2. As a result of the operation of the fan 5 a constant induced flow is generated from the upper end of the body 1 through the space between the walls of the housing 2 and the body 1 to the lower open end of the body 1 from which the mist is sucked up. The grains falling down by the action of gravity below the chamber 19 are put into continuous oblique and swirling movement by the directing elements 9 and the directing vanes 11 of the modules 7 and 10, and while moving they are effectively dressed over their entire surface. The throttle valve 15 enables to adjust the flow rate of the dressing agent in the form of mist, depending on the type of material to be dressed.

What is claimed is:

1. An apparatus for dressing surface of a grained material or granules, having a vertical through body, provided with arranged alternately first modules having a centrifugal flow guide in a form of an axial support and a plurality of directing elements ends of which face an inner wall of the vertical through body and second modules having a centripetal flow guide in a form of plurality of directing vanes positioned on an inner wall of each one of the second modules ends of the vanes face towards the vertical axis of the vertical through body, in the vertical through body above the uppermost of one of the first modules having the centrifugal flow guide there is an axially attached hopper connected with a container of grained material, whereas the vertical through body is positioned inside a cylindrical housing, and in the upper part of the cylindrical housing, above the vertical through body, there is an axially positioned a fan driven by a motor, characterized in that below the uppermost of one of the first modules having the centrifugal flow guide there is an axially positioned nozzle supplying a dressing agent, directed onto a dispersing screen having a small openings, which constitutes a cover of a chamber arranged axially below the axially positioned nozzle and connected with an outer external blower, whereas above the axially positioned nozzle on the vertical axis of the vertical through body there is positioned a shield, whereas below the chamber there is arranged one of the second modules having the centripetal flow guide, below which there is positioned another one of the first modules having the centrifugal flow guide, and the lower end of the vertical through body is constituted by the one of the second modules having the centripetal flow guide.

2. The apparatus according to claim 1, characterized in that the upper end of the cylindrical housing is tightly closed.

3. The apparatus according to claim 2, characterized in that the lower end of the cylindrical housing is open and constitutes an outlet funnel of dressed material.

4. The apparatus according to claim 1, characterized in that the upper open end of the vertical through body is positioned below the fan.

5. The apparatus according to claim 3, characterized in that the cylindrical housing is attached to a stationary frame.

6. The apparatus according to claim 1, characterized in that a rotary air throttle 15 is mounted in the vertical through body perpendicularly to the vertical axis of the vertical through body above the hopper.

7. The apparatus according to claim 1, characterized in that a ratio of an area (F) of a cross-section of the cylindrical housing to an area (S) of a cross section of the vertical through body 1 fulfils a condition $$1,3 \leq \frac{F}{S} \leq 8.$$

8. The apparatus according to claim 1, characterized in that the hopper is closed from above with a cover having a shape of a spherical cap.

9. The apparatus according to claim 1, characterized in that the shield has the shape of a spherical cap of a diameter of the base bigger than the diameter of the chamber covered with the dispersing screen having small openings.

10. The apparatus according to claim 9, characterized in that a ratio of an area (S) of a cross-section of the vertical through body to an area (G) of the dispersing screen fulfils a condition $$6 \leq \frac{S}{G} \leq 70.$$

11. The apparatus according to claim 1, characterized in that the dispersing screen is shaped as a spherical cap.

12. The apparatus according to claim 11, characterized in that a ratio of an area (S) of a cross-section of the vertical through body to an area (G) of the dispersing screen fulfils a condition $$6 \leq \frac{S}{G} \leq 70.$$

13. The apparatus according to claim 1, characterized in that the dispersing screen is cone-shaped.

14. The apparatus according to claim 1, characterized by having a plurality of the first modules with the centrifugal flow guide and a plurality of the second modules with the centripetal flow guide, whereas the first modules with the centrifugal flow guide and the second modules with the centripetal flow guide are positioned alternately below the chamber.

\* \* \* \* \*